Patented May 8, 1945

2,375,687

UNITED STATES PATENT OFFICE 2,375,687

PROCESS FOR PRODUCING BETA-OLEFINS

Walter H. Peterson and John Anderson, Berkeley, Calif., assignors to Shell Development Company, San Francisco, Calif., a corporation of Delaware No Drawing. Application August 29, 1941, Serial No. 408,832

11 Claims. (Cl. 260—683.2)

This invention relates to a process for shifting the double bond of secondary olefins containing at least four carbon atoms, and more particularly to the conversion of olefins having a terminal double bond between non-tertiary carbon atoms to non-tertiary olefins in which the double bond is not terminally located. In one of its specific embodiments, the invention is directed to the treatment of butene-1 or hydrocarbon mixtures predominating in or containing the same, to convert butene-1 to butene-2. The term "non-tertiary olefines," as employed herein and in the appended claims, refers to those olefins in which there is no branching of the carbon atom chain at the double bonded carbon atoms, although such carbon atom chain may branch at carbon atoms remote from the unsaturated or double bonded carbon atoms.

It has now been discovered that terminally-unsaturated non-tertiary olefins of the class defined above may be readily converted to the corresponding secondary olefins which are not terminally unsaturated by subjecting them to the action of certain metals under carefully controlled conditions of operation. It has been further discovered that this conversion may be readily effected in the absence of free hydrogen, or hydrogen-yielding materials, or any other reactive gaseous or vaporous substance or material in the reaction zone. For example, contrary to the well-established belief that the catalytic conversion of alpha-unsaturated non-tertiary olefins necessitates the presence of substantial amounts of hydrogen in the reaction zone, it has been found that such conversion may be readily effected according to the present invention in the substantial or complete absence of hydrogen or the like. It has been further discovered that alpha-unsaturated straight-chain olefins having at least four carbon atoms per molecule may be converted to the corresponding beta-unsaturated olefins in good yield by subjecting them, in the substantial or complete absence of hydrogen, to elevated temperatures in the presence of metals of the 8th group of the periodic table, particularly reduced cobalt and/or reduced nickel, preferably in a finely divided form. A specific embodiment of the invention resides in the discovery that butene-1, as well as other relatively low-boiling, terminally unsaturated non-tertiary olefins, such as pentene-1, hexene-1, and the like, when subjected in the absence of hydrogen to the action of the above-mentioned catalysts at temperatures of between about 35° C. and about 150° C., and, under some conditions, at somewhat higher temperatures, may be converted to the corresponding beta-unsaturated olefins without any substantial or even noticeable isomerization of the carbon structure and without substantial polymerization of the primary material.

Although pressure apparently has little or no effect upon the reaction discussed herein, there is a critical temperature range within which the yield of the desired conversion products is highest and, other conditions being maintained equal, the yield of such products drops when the reaction is effected at higher temperatures. For example, as clearly shown in the examples presented hereinbelow, there is substantially no conversion of butene-1 to butene-2 when the former is subjected at temperatures of about 34° C. to the action of reduced cobalt deposited on a highly porous material such as activated carbon. On the other hand, when the same treatment is effected, in the substantial absence of hydrogen but in the presence of reduced cobalt on activated carbon, at temperatures between about 90° C. and about 100° C., the conversion to butene-2 is practically quantitative. Furthermore, experiments indicate that this conversion decreases with a further rise in the reaction temperature. The yield of the desired beta-olefins is not the same throughout the defined temperature range, the highest conversion, at least insofar as the rearrangement of butene-1 to butene-2 is concerned, being attained when the reaction temperature is maintained between about 80° C. and about 120° C. The optimum reaction temperature may vary however to a certain degree depending on the catalyst employed, its concentration in the reaction zone, the particular olefin subjected to treatment, residence time of the olefins in the reaction zone, presence or absence of diluents, etc. Generally, however, it may be stated that, other conditions being maintained equal, the conversion is preferably effected at a temperature between about 35° C. and about 150° C., and preferably between about 80° C. and about 120° C.

The process of the present invention is applicable to the treatment of various unsaturated hydrocarbons and particularly to those having a terminal double bond between two non-tertiary carbon atoms. It is of particular use for the rearrangement of alpha-unsaturated mono-olefins having at least four carbon atoms per molecule, these hydrocarbons being non-tertiary in the sense that the double bonded carbon atoms are non-tertiary, although the hydrocarbon may contain tertiary carbon atoms remote from the double bonded carbon atoms. The radicals attached to such tertiary carbon atoms may be of alkyl, aryl or aralkyl character. Butene-1, pentene-1, hexene-1, and the higher homologues, are examples of alpha-unsaturated straight-chain olefins which may be converted according to the present process, while compounds of the type of 3-methyl-pentene-1, 4-methyl-hexene-1, and 4-phenyl-hexene-1 are examples of compounds containing saturated tertiary carbon atoms remote from the double bonded carbon atoms. Instead of employing pure olefins for the purpose of converting them in accordance with the process of the present invention, it is also possible to use hydrocarbon mixtures predominating in or containing such olefins. For example, light hydrocarbon fractions consisting of butylenes and butanes may be employed as starting materials. In this connection it must be noted, however, that it is generally preferable to pre-treat such fractions to remove the readily polymerizable diolefins and unsaturated tertiary hydrocarbons. For instance, when hydrocarbon fractions predominating in or containing butene-1 are to be treated according to the present process to convert the butene-1 to butene-2, the presence of isobutylene in such fractions is usually undesirable because it readily polymerizes under the employed operating conditions. The resinous polymers thus produced will coat the catalyst thus shortening the active life thereof and necessitating frequent and repeated regeneration of the catalyst. The preliminary separation of such highly reactive hydrocarbons may be effected by any known means such as selective absorption in cold sulfuric acid, selective polymerization of the isobutylene and the like with dilute sulfuric acid solutions, e. g. 55 to 65 percent sulfuric acid, or by the use of a volatile inorganic halide catalyst of the Friedel-Crafts type, or the like. Although the presence of saturated hydrocarbons such as butane, pentane, and the like is not detrimental, these hydrocarbons have a diluting action on the treated olefins and the presence of these paraffins generally necessitates more rigorous operating conditions to obtain the desired conversion of the alpha-unsaturated olefins. Therefore, in cases where it is desirable to effect the conversion under relatively mild conditions of operation, it is generally preferable to treat the hydrocarbons first to remove therefrom the saturated constituents, and then to subject the remaining olefins which predominate or contain the hydrocarbons to be converted, to the treatment according to the process of the present invention.

The process is executed in the presence of catalysts consisting of the metals of the 8th group of the periodic table. Of these metals, cobalt is the preferred catalyst. The metals are used in a reduced state and are preferably employed in the form of finely divided particles disposed on various carriers such as activated carbon, pumice, clay, and various types of aluminas and alumina silicates. The use of activated carbon as the carrier for the reduced metal, such as reduced cobalt, has been found to be of particular benefit for the conversion of butene-1 and the like to produce high yields of the corresponding beta-olefins, such as butene-2, and the like. The use of the carriers for the catalyst metals is advantageous since it permits an accurate control between the olefins to be converted and the metal catalyst in the reaction zone, while maintaining other operating conditions, such as the reaction temperature, pressure, space velocity, contact time, etc., constant. The metal catalyst, for example, reduced cobalt, whether employed alone or in the preferred form of a finely divided metal disposed on activated carbon or the like, may be prepared and employed in a variety of ways. For example, it may be used in the form of compact masses, granules, chips, powder, etc. One method of preparing the catalyst includes the steps of absorbing aqueous cobaltous nitrate on activated carbon or the like, decomposing the nitrate to the corresponding oxide by a prolonged heating at an elevated temperature, and finally reducing the oxide by heating while passing hydrogen through the catalyst mass. Other methods of preparing the reduced catalyst metal, as well as the incorporation thereof onto porous carriers, may be employed. The concentration of the active reduced metal catalyst may vary within relatively wide limits, depending on the specific metal employed, the desired contact time, presence or absence of diluent, and the like. When butene-1 is to be converted to butene-2 according to the present invention, and when the throughput of the primary material is maintained at about 100 grams per hour per liter of catalyst space, good conversions have been obtained when the ratio of cobalt to carbon is in the neighborhood of 14 to 86. However, much higher or lower concentrations of the catalyst may also be used.

Instead of using a solid catalyst bed through which the reactants are conveyed, it is also possible to effect conversion according to the present invention by maintaining the catalyst, e. g. reduced cobalt, whether used alone or on a carrier, in suspension in the reaction zone. This suspension of the catalyst (which may be in a fluidized state) may be realized, for example, by maintaining it in an agitated state, as by blowing, stirring, and the like.

The conversion of the defined alpha-unsaturated olefins to the corresponding beta-unsaturated hydrocarbons, may be effected in a batch, intermittent or continuous manner. One method of operation comprises the disposition of the catalyst in one or more reaction vessels, preferably disposed in parallel, and the passage of the unsaturated hydrocarbons to be treated through these catalyst-containing reaction tubes. The reaction temperature is maintained within the desired or optimum range, for instance by an external heating or cooling of the reaction zones. The olefins to be treated, whether preliminarily heated to the desired reaction temperature or not, may be conveyed through the catalyst-containing reaction zone at a rate sufficient to effect an economic conversion rate. The throughput of the olefins, however, should not be too slow since the same catalysts promote the polymerization of the olefins to produce dimers, trimers, and higher polymers thereof. The rate of throughput of the olefins will vary depending on the specific catalyst employed, the olefins to be converted, the temperature used and the desired conversion rate. The reaction products withdrawn from the reaction zone may be treated to recover the olefin products from the unreacted hydrocarbons, which may then be treated further, if desired, to effect the conversion of the unreacted olefins.

Although the effective life of the catalyst is quite long, its efficiency nevertheless appears to decrease with use. For example, when the catalyst consisting of reduced cobalt disposed on activated carbon has been used for a relatively long period of time for the conversion of butene-1 to butene-2, the conversion rate begins to drop so that with time the process becomes uneconomical because of low conversion rates. This drop in efficiency is particularly noticeable when excessive polymerization occurs, and is apparently due to the adsorption of such olefin polymers by the catalyst. In order to regenerate the catalyst it is necessary to remove these adsorbed organic materials. This may be effected by heating the partially spent catalyst to a temperature sufficient to vaporize the impurities. When using impure alpha-unsaturated non-tertiary olefins, or impure hydrocarbons containing the same, as the primary material, the metal of the catalyst is frequently oxidized by the oxygen or oxygen-yielding materials present in the feed. In order to reactivate the catalyst thus poisoned, it is generally necessary to employ hydrogen during the heating step in order to reduce the metal oxides to the corresponding metal. This hydrogen simultaneously acts as a carrier which sweeps out the vaporized polymers and the like adsorbed by the catalyst during the conversion step. When the treated hydrocarbon material does not contain any oxygen or oxygen-yielding materials, there is no need of using hydrogen during the regeneration step. In such cases it is possible to use inert gases, e. g. nitrogen, for the purpose of aiding in the removal of the vaporized polymers. The regeneration of partially spent cobalt catalysts has been successfully realized when the heating was effected at atmospheric pressures and at temperatures in the neighborhood of 300° C. However, less drastic conditions may also be used.

In the execution of the process of this invention, the specified olefins or hydrocarbon mixtures containing the same may be first pre-heated to the desired or optimum reaction temperature, and then conveyed through the catalyst-containing reaction zone. The rate of throughput, and therefore the residence time, will vary depending on the other operating conditions, such as the temperature, the presence or absence of diluents, the particular alpha-unsaturated olefin treated, the catalyst employed, etc. In general, the use of higher temperatures will permit greater throughputs. Pressure apparently has little if any effect on the conversion rate. The use of relatively long residence periods, even when temperatures near the lower limit of the described temperature range are employed, will in general promote the polymerization of the olefins. Therefore, the throughput should be regulated so as to allow the primary material sufficient contact time to effect the desired conversion to the beta-olefins, while at the same time preventing or inhibiting substantial polymerization. The selection of optimum or desired operating conditions will be readily determinable by anyone skilled in the art.

Although the reaction may be effected at atmospheric pressure, it is generaly advisable to employ higher pressures which may be in the order of 50 to 60 atmospheres, or even higher. Also, the primary material may be in a vapor, liquid or mixed state in the reaction zone.

The following detailed examples are given for the purpose of illustrating the present process and modes of executing the same. It is to be understood, however, that the invention is not to be considered as limited to the specific modes or conditions of operation disclosed.

*Example I*

The catalyst employed was prepared by absorbing hydrated cobaltous nitrate on 4-10 mesh activated carbon, then baking the resulting material for a period of between about 12 and 16 hours at a temperature of about 105° C. to remove the water and to effect the decomposition of the cobaltous nitrate to the oxide, and finally reducing the latter by heating to a temperature of about 300° C., while passing hydrogen over the catalyst. About 250 cc. of this catalyst were disposed in a reactor consisting of a tube 38 inches long, having an internal diameter of 1.03 inches and equipped with an axially disposed thermo-couple well having an external diameter of 0.25 inches. The hydrocarbon fraction treated consisted of 91% alpha-butylene and 9% beta-butylene. This fraction was conveyed through the reaction zone at the rate of about 110 grams per hour per liter of catalyst space. The reaction temperature was maintained at about 94° C., the pressure being about 60 pounds per sq. in. gauge. The run was continued for a period of four hours during which time 110 grams of the butylenes were conveyed through the reactor. An analysis of the reaction product indicated that it consisted of about 9% butene-1, 88% butene-2, and 3% higher polymers. Therefore, the conversion of butene-1 to butene-2 was equal to about 93% of the theoretical.

*Example II*

This run was conducted with the same feed and catalyst employed in the previous example, with the exception that the hydrocarbons were maintained in the reactor at a pressure of about 750 pounds per sq. in. An analysis of the reaction product showed the same composition as that produced by effecting the reaction at 60 pounds per sq. in., thus indicating that pressure apparently has little if any effect.

*Example III*

The catalyst and hydrocarbons used were the same as those of Example I. However, the feed rate was increased to about 196 grams per hour per liter of catalyst space. The temperature in the reactor was maintained at about 34° C., the hydrocarbons being conveyed at a pressure of about 60 pounds per sq. in. An analysis of the hydrocarbon fraction withdrawn from the reactor indicated substantially no isomerization of the butene-1 to butene-2.

*Example IV*

In order to determine whether the presence of reduced cobalt was necessary for the conversion, the experiment disclosed in Example I was repeated. However, in this case the activated carbon disposed in the reactor did not contain any cobalt deposited thereon. The reaction products did not show any increase in the beta-butylene content, thus indicating that the presence of a catalyst is necessary.

While this process has been described and illustrated mainly with reference to the production of butene-2 from butene-1 or from a fraction containing mainly four carbon atom hydrocarbons, it can be applied equally well to fractions containing five, six or more carbon atoms per molecule and to unfractionated mixtures containing four, five, six and more carbon atoms per molecule. If it is desired to prepare a pure butene-2, pentene-2, hexene-2, or hexene-3, etc., the process may be applied to the corresponding alpha-unsaturated non-tertiary mono-olefin, to the corresponding fraction of cracking still vapors, or to the unfractionated mixture of hydrocarbon vapcrs, and the reaction products obtained may be fractionated subsequently to recover the desired beta-olefins.

We claim as our invention:

1. A process for the production of butene-2 from a hydrocarbon mixture containing butene-1 and isobutylene which comprises treating said hydrocarbon mixture with 55% to 65% sulfuric acid to polymerize selectively the tertiary olefins, separating the polymers thus formed and the sulfuric acid from the remaining hydrocarbon mixture, contacting the remaining hydrocarbon mixture with a catalyst comprising reduced cobalt on activated carbon in the substantial absence of hydrogen and at a temperature of between about 80° C. and about 120° C., thereby converting butene-1 to butene-2, and recovering the butene-2 in an unpolymerized form.

2. A process for the production of butene-2 from hydrocarbon mixtures containing butene-1 and isobutylene which comprises treating the hydrocarbon mixture to remove selectively the isobutylene, contacting the remaining hydrocarbon fraction with a catalyst comprising reduced cobalt in the substantial absence of hydrogen and at a temperature of between about 35° C. and about 150° C., thereby converting butene-1 to butene-2, and recovering the butene-2.

3. A process for the production of butene-2 which comprises contacting butene-1 with reduced cobalt deposited on activated carbon in the substantial absence of hydrogen at a temperature of between about 80° C. and about 120° C. and for a period of time sufficient to effect the conversion of the butene-1 to butene-2 but insufficient to effect substantial polymerization of these olefins.

4. A process for the production of butene-2 which comprises contacting butene-1 with reduced cobalt on activated carbon in the substantial absence of hydrogen and at a temperature of between about 80° C. and about 120° C.

5. A process for the production of butene-2 which comprises contacting butene-1 with reduced cobalt on activated carbon in the substantial absence of hydrogen and at a temperature of between about 35° C. and about 150° C.

6. A process for the production of butene-2 which comprises contacting butene-1 with reduced cobalt in the substantial absence of hydrogen and at a temperature of between about 35° C. and about 150° C.

7. A process for the production of beta-unsaturated olefins which comprises treating hydrocarbon mixtures containing unsaturated hydrocarbons including homologous tertiary olefins and alpha-unsaturated straight-chain mono-olefins with 55-65 percent sulfuric acid to polymerize the tertiary olefins selectively, separating the polymers thus formed and the sulfuric acid, contacting the remaining hydrocarbon mixture with a catalyst comprising reduced cobalt in the substantial absence of hydrogen and at a temperature of between about 80° C. and about 120° C., thereby converting the alpha-unsaturated straight-chain mono-olefins to the corresponding beta-olefins, and recovering the beta-olefins.

8. A process for the production of beta-unsaturated olefins which comprises treating hydrocarbon fractions containing unsaturated hydrocarbons including tertiary olefins and alpha-unsaturated straight-chain mono-olefins, to polymerize selectively the tertiary olefins, separating the polymers thus formed and contacting the remaining hydrocarbon fraction in the substantial absence of hydrogen and at a temperature of between about 35° C. and about 150° C. with a catalyst comprising reduced cobalt for a period of time sufficient to convert the alpha-unsaturated mono-olefins to the corresponding beta-unsaturated olefins but insufficient to effect substantial polymerization of the unsaturated hydrocarbons.

9. A process for the production of beta-unsaturated olefins which comprises contacting terminally unsaturated non-tertiary olefins with reduced cobalt on activated carbon in the substantial absence of hydrogen, at a temperature of between about 80° C. and about 120° C., and for a period of time sufficient to effect the conversion of said terminally unsaturated olefins to the corresponding beta-unsaturated hydrocarbons but insufficient to effect substantial polymerization of these olefins.

10. A process for the production of beta-unsaturated olefins which comprises contacting a terminally unsaturated non-tertiary olefin with reduced cobalt at a temperature of between about 35° C. and about 150° C. in the substantial absence of free hydrogen.

11. A process for the isomerization of terminally unsaturated non-tertiary olefins to beta-unsaturated olefins which comprises contacting said olefins with reduced cobalt at a temperature of between about 80° C. and about 120° C. in the substantial absence of free hydrogen for a period of time sufficient to effect the conversion but insufficient to effect substantial polymerization of the olefins.

WALTER H. PETERSON.
JOHN ANDERSON.